350-96.1 SR
XR 3,650,187
X 3067 R
X 3064 Y
(4)

United States Patent

Judin

[15] 3,650,187

[45] Mar. 21, 1972

[54] PHOTO-OPTICAL OSCILLOGRAPH AND HIGH FREQUENCY SOUND RECORDER

[72] Inventor: Herbert Judin, Dix Hills, N.Y.

[73] Assignee: Areoptix Technology Corporation, Plainview, N.Y.

[22] Filed: Nov. 28, 1969

[21] Appl. No.: 880,616

Related U.S. Application Data

[63] Continuation-in-part of Ser. No. 727,384, Feb. 26, 1968, which is a continuation-in-part of Ser. No. 41,763, June 3, 1970, which is a Division of Ser. No. 419,512, Dec. 18, 1964, now Pat. No. 3,379,832.

[52] U.S. Cl. ................................95/4.5, 350/96, 179/100.3
[51] Int. Cl. ................................B41b 19/00
[58] Field of Search ..................178/7.6; 179/100.3, 100.31; 350/96, 247, 175 SL; 95/4.5, 12, 1

[56] References Cited

UNITED STATES PATENTS

| | | | |
|---|---|---|---|
| 2,091,152 | 8/1937 | Malpica | 350/96 X |
| 2,923,781 | 2/1960 | Gordon et al. | 179/100.3 |
| 3,166,623 | 1/1965 | Waidelich, Jr. | 350/96 B |
| 3,379,832 | 4/1968 | Judin | 178/7.6 |
| 3,394,976 | 7/1968 | Hawkins | 350/96 X |
| 3,398,665 | 8/1969 | John, Jr. et al. | 350/247 |
| 3,470,320 | 9/1969 | Pike et al. | 350/96 X |

*Primary Examiner*—John M. Horan
*Assistant Examiner*—Thomas A. Mauro
*Attorney*—Keith Misegades and George R. Douglas

[57] ABSTRACT

An oscillating ball that is piezo-electrically driven, or by other electrical means or by acoustical control caused to oscillate upon application of impulses so that by using the rotatable or oscillating member electrical treatment of optical energy is achieved, the oscillation being sufficiently rapid to achieve undulation for recording audio signals, called "optical sound," upon a recorder such as a film strip or the like. When a laser beam input is employed directly on the oscillating ball, a new printing mode is at hand. The vibrating ball is a small miniature spherical lens system forming the micro-projection system, such as the balls that are disclosed in Judin U.S. Pat. No. 3,379,832 and other Judin patent applications.

19 Claims, 3 Drawing Figures

3650187
OR IN 354/4

INVENTOR
HERBERT JUDIN

BY Mussgades & Douglas
ATTORNEYS

INVENTOR
HERBERT JUDIN

BY Mesgades & Douglas
ATTORNEYS

PHOTO-OPTICAL OSCILLOGRAPH AND HIGH FREQUENCY SOUND RECORDER

This is a continuation-in-part application of Judin application Ser. No. 727,384 filed Feb. 26, 1968, which is now streamlined application Ser. No. 41,763, filed June 3, 1970, for "Micro-Optical Image-Forming and Projection System," which, in turn, is a divisional application of Judin U.S. Pat. No. 3,379,832.

The present invention relates to a micro-projection system using a miniature spherical lens or lenses mounted or supported by a small wire or small thread assembly or by any electrically driven resilient means. More particularly, the invention relates to a support track for holding a vibrating ball and an oscillating plate assembly, the plate assembly being part of an electrical circuit. The beam from a light source is collimated before being applied to the vibrating ball, so that the resulting light emanating therefrom is a translating beam of light which is applied to a film or paper recording medium. The oscillating plate assembly may also be part of, or to go with, a piezo electric drive, or a directly driven acoustic control, or the drive may be a magnetostrictive drive means. It is the invention that the ball and plate assembly is miniaturized so that their total mass is of the order of only a few grams so that it can be easily set into oscillatory motion at audio and even video frequencies.

It is a further object of the invention to provide a vibrating ball and plate assembly in which the ball has a mask fastened to it for receiving a collimated beam for passing therethrough, and in which the masked ball translates the beam into a single pattern depending upon electrical impulse energy applied to control plates or other drive means therefor.

It is another object of the invention to provide an electrical pulsing system in which a micro-projection system, including a miniature spherical lens, may be translated into an $x$ - $y$ directional arrangement for projecting a translating beam onto a film or paper recording medium.

It is another object of the invention to provide a laser beam input directly upon the miniature spherical lens, thereby eliminating the need of a collimating lens system.

The incident collimated light beam may be modulated by optical or electronic means for image detail printing, as required. (Such as a photograph or alpha-numeric generator.) When a direct laser beam input is employed, a high optical energy point is produced by the translating oscillating ball affording a high speed printing capability.

The above and other objects and advantages of the invention will become apparent upon full consideration of the following detailed description and accompanying drawings in which.

Figure 1:
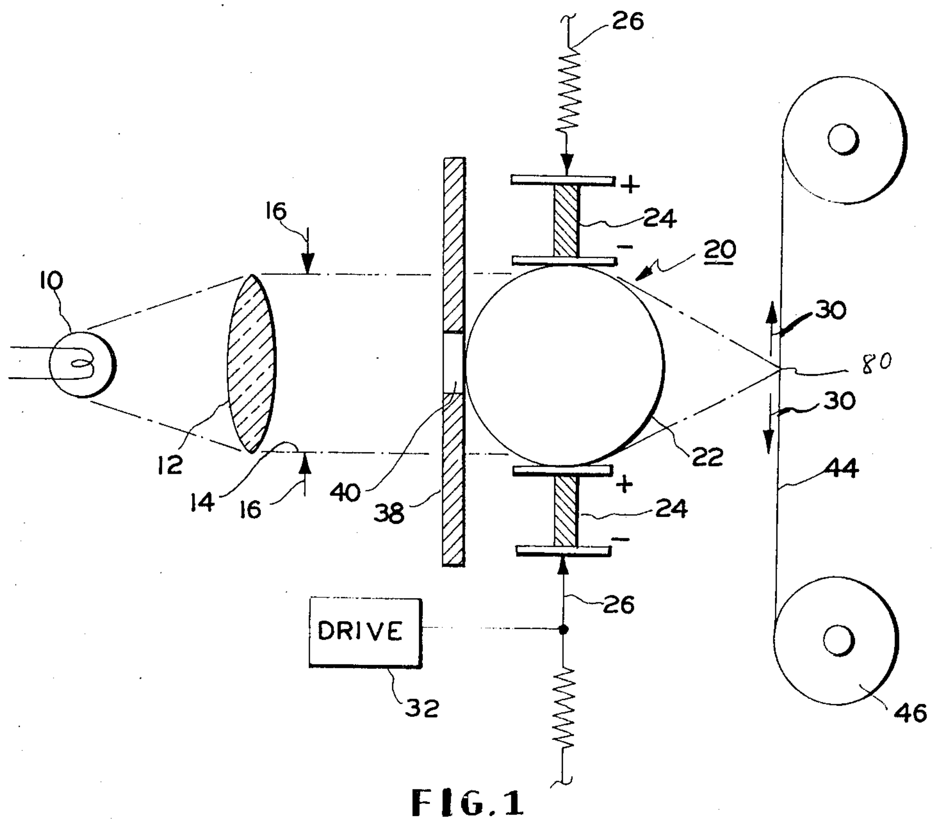
FIG. 1 is a schematic diagram of the oscillating ball, electrical impulse and optical sound recorder arrangement according to a preferred embodiment of the invention.

Referring now to the drawings, there is shown in FIG. 1 a light source 10 which passes light to a lens 12 for producing a collimated beam 14 of light which is limited by the arrows 16,16.

The collimated beam is projected in the direction of a micro-projection system 20 having a small miniature spherical lens or glass ball 22 which is supported by resilient means 24, such as a thread, wire or other type means.

The glass ball 22 is an optically uncorrected converging lens, as has been described in U.S. Pat. No. 3,379,832 and in application Ser. No. 727,384, which description is incorporated herein by reference; and which is approximately between 1 and 3 millimeters in diameter or up to one eighth inch in diameter. Such glass balls when utilized with collimated beams or beams of limited divergence produce a diffraction limited image having dimensions of only a few microns.

Disposed on the upper and lower edges of the glass ball 22 are charge plates which form a part of an electrical control circuit to which electric wires or conductors 26,26 are connected for completing a circuit through the wire or thread means 24,24, so that the micro-projection system 20 is caused to translate through the collimated beam in the direction shown by arrows 30,30. The micro-projection system 20 may be conveniently connected to wires or conductors 26,26 to a magneto-strictive drive arrangement 32 or a piezo-electric drive, or an acoustic control or the like.

There may be disposed on the front side of the micro-projection system 20 a centrally apertured mask 38 fastened to the ball at its contact point and having an aperture 40. In this way, selected portions of the collimated beam may be provided to pass through the micro-projection system 20 and, as a result, the portion that reaches the translating beam shown by arrows 30,30 is received on a film or paper transport means or other recording means 44, which film or paper transport may be wound upon a spool 46, as desired.

It is within the purview of the invention to provide translating beams in the $x$ - $y$ direction, as well as in the $x$-and $y$-direction similar to the translation shown by the arrows 30,30. When coupled to a modulating light control system and operated in the $x$ - $y$ mode, it is possible to produce an alpha-numeric printing capability.

Figure 2:
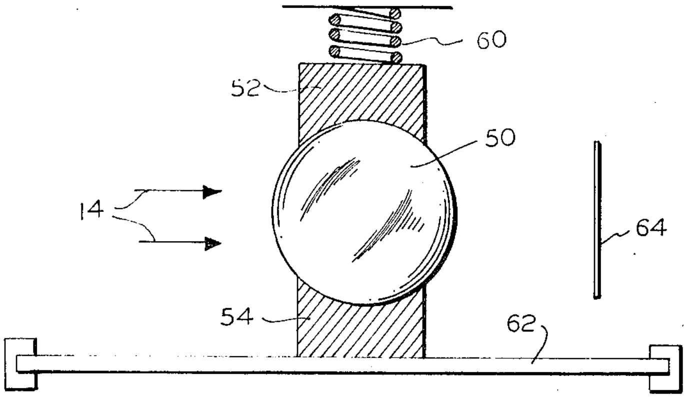
FIG. 2 is a schematic diagram embodying an acoustic control arrangement.

FIG. 2 shows a collimated light beam 14 impinging on a masked ball 50 which has masking portions 52,54 that may be formed as a body of revolution about the ball 50. An upper portion 52 is supported by a spring 60, and the bottom portion 54 is resiliently mounted on a diaphragm 62 or other acoustic resonating means (not shown), so that the ball 50 may be dynamically oscillated according to the applied acoustic energy on the diaphragm 62.

The resultant fine point of light traces out an oscillating point image on a photosensitive medium 64, which may be fixed or moved as desired.

Figure 3:
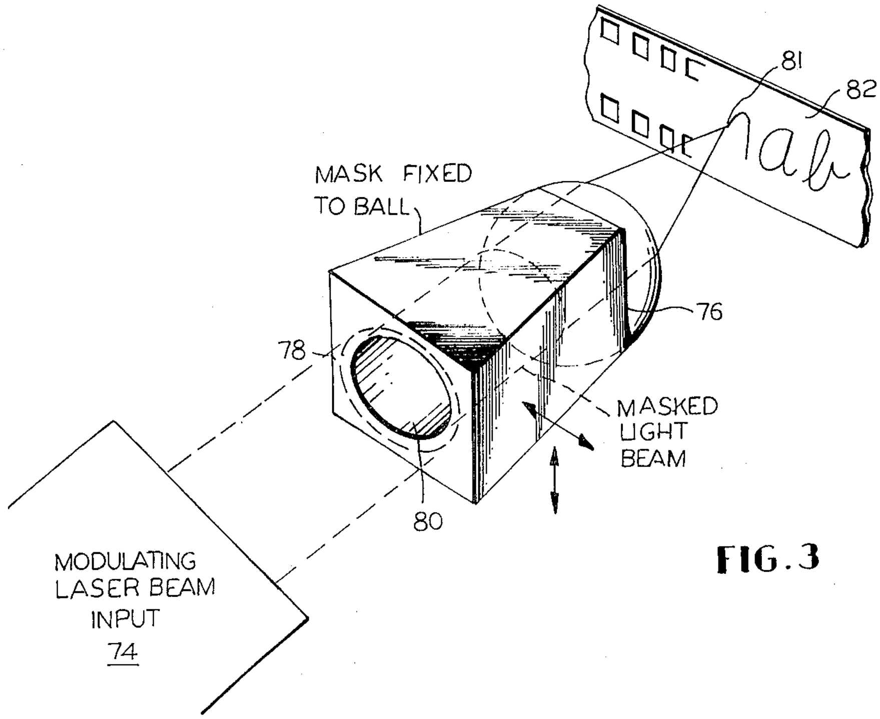
FIG. 3 is an exploded perspective view showing a laser beam input arrangement according to the invention.

FIG. 3 shows a modulating laser beam input 70 which is modulated by an electro-optical shutter (not shown) or other well-known means, producing varying light intensities of collimated light 74 which is incident upon a ball 76. A mask 78 having an aperture 80 is fixed to the input side of the ball 76. The ball acts as a spherical lens to focus the light, as has been described above. The ball 76 may be dynamically activated bi-directionally in response to forcing functions, such as acoustic, electromagnetic piezo-electric, pneumatic, hydraulic and other arrangements of force means, whether singly or in combination.

FIG. 3 also shows a diffraction limited image 81 received on a moving film 82 or photosensitive tape or media, of constant unidirectional motion. The aperture 80 may be round or slit-shaped in configuration when a cylindrical lens is employed.

The foregoing is considered illustrative only of the principles of the invention. Since numerous modifications and changes will readily occur to those skilled in the art, it is not desired to limit the invention to the exact construction and operation shown and described and, accordingly, all suitable modifications and equivalents may be resorted to falling within the scope of the invention as claimed and within the standard of one skilled in the art established similar to 103 or Title 35 U.S.C.

What is claimed is:

1. An optical recorder comprising a micro-projection system having a small miniature spherical lens, said micro-projection system being supported by resilient means secured onto a frame member, electric drive means to vibrate said micro-projection system in accordance with a signal fed to said electric drive means, and means applying a collimated light beam to said micro-projection system.

2. The invention according to claim 1 wherein said miniature spherical lens has a mask disposed thereon to intercept certain portions of said collimated light beam.

3. The invention according to claim 1 wherein said electric drive is a magneto-strictive drive.

4. The invention according to claim 1 wherein said electric drive is a piezo-electric drive.

5. The invention according to claim 1 wherein said electric drive is acoustically controlled.

6. The invention according to claim 1 wherein said resilient means is a supportive track means for holding said miniature spherical lens, said track means including at least one plate which is oscillated.

7. The invention according to claim 1 wherein said collimated light beam passing said miniature spherical lens is directed onto recording means.

8. The invention according to claim 7 wherein said means are provided to transport said recording means onto a takeup roll.

9. The invention according to claim 1 wherein said resilient means and said drive means provide for translation in each of an *x*- and *y*- axis.

10. THe invention of claim 1 wherein said lens is a converging lens.

11. The invention of claim 1 wherein said lens is a glass ball.

12. The invention of claim 1 wherein said lens is a cylindrical lens.

13. The invention of claim 1 wherein said lens is a spherical section of a glass ball.

14. The invention of claim 1 wherein said lens is a hemispherical section of a glass ball.

15. The invention of claim 1 wherein the collimated light beam is modulated in the *x* - *y* mode producing a trace for alpha-numeric character printing.

16. The invention of claim 1 wherein said collimated light applying means is a laser beam means.

17. The invention according to claim 1 wherein said lens is optically uncorrected.

18. The invention according to claim 1 wherein said microprojection system produces a diffraction limited image.

19. The invention according to claim 1 wherein said lens is of single-material construction.

* * * * *